United States Patent [19]
Barton et al.

[11] Patent Number: 5,132,528
[45] Date of Patent: Jul. 21, 1992

[54] ARRANGEMENT FOR MEASURING LASER POWER INCORPORATING A FIRST PARTIALLY TRANSMITTING MIRROR AND A SECOND PARTIALLY TRANSMITTING MIRROR POSITIONED BY 90° DEGREES

[75] Inventors: Udo Barton, München; Gerhard Ruf, Eichstätt, both of Fed. Rep. of Germany

[73] Assignee: Messerschmitt-Bolkow-Blohm GmbH, Fed. Rep. of Germany

[21] Appl. No.: 698,981

[22] Filed: May 13, 1991

[30] Foreign Application Priority Data

May 14, 1990 [DE] Fed. Rep. of Germany ....... 4015447

[51] Int. Cl.⁵ .................................................. H01J 3/14
[52] U.S. Cl. ....................................... 250/216; 372/108
[58] Field of Search ................... 250/216, 205, 225; 219/121.62; 372/29, 31, 99, 107, 108

[56] References Cited

U.S. PATENT DOCUMENTS

| | | | |
|---|---|---|---|
| 3,588,738 | 6/1971 | Goodwin | 372/29 |
| 4,210,810 | 7/1980 | Berry et al. | 250/347 |
| 4,669,088 | 5/1987 | Waite | 372/108 |
| 5,023,886 | 6/1987 | Hobart et al. | 372/99 |

FOREIGN PATENT DOCUMENTS

3205507  2/1981  Fed. Rep. of Germany .

*Primary Examiner*—David C. Nelms
*Assistant Examiner*—T. Davenport
*Attorney, Agent, or Firm*—Evenson, Wands, Edwards, Lenahan & McKeown

[57] ABSTRACT

Apparatus and method for measuring the radiation power of a laser. Two partially transmitting mirrors are arranged in the main laser beam which, with respect to their orientation in space, are turned by 90° with respect to one another and by which a portion of the radiation is coupled out, and the partial beam is directed to an electro optic transducer. The measuring arrangement is therefore independent of the polarization condition of the main laser beam.

5 Claims, 1 Drawing Sheet

ARRANGEMENT FOR MEASURING LASER POWER INCORPORATING A FIRST PARTIALLY TRANSMITTING MIRROR AND A SECOND PARTIALLY TRANSMITTING MIRROR POSITIONED BY 90° DEGREES

BACKGROUND AND SUMMARY OF THE INVENTION

The invention relates to an arrangement for measuring the radiation power of a laser, having a partially transmitting mirror arranged in the main beam of the laser, by which a portion of the radiation is coupled out, and having an electro optic transducer arranged in the partial beam.

In the case of high-powered lasers, particularly for surgical purposes, it is necessary to measure continuously the power coupled out of the laser resonator. For this purpose, it is known to arrange a partially transmitting mirror in the main beam of the laser by which a small percentage of the radiation power is coupled out by reflection on the mirror and is directed to a photodiode or the like (German Patent Document DE 32 05 507 C2). It was found, however, that, on the one hand, the reflection capacity of common splitter plates is different for light impinging in a parallel and perpendicularly polarized manner (relative to the plane of incidence) and, on the other hand, the orientation of the polarization plane changes during the pumping of laserable crystals, such as Nd-YAG, so that, as a function of the pumping effect, the proportion of the laser radiation impinging on the splitter plate in a perpendicularly or parallel polarized manner differs. In the case of a fixedly arranged splitter plate, specific proportions of the parallel and perpendicularly polarized light are coupled out. However, because of the above-mentioned conditions, the sum of both proportions is not proportional to the respective laser power.

It is therefore an object of the invention to provide an arrangement for measuring the radiation power of a laser which, over a wide measuring range, operates proportionally and independently of the privileged direction of the polarization plane of the laser radiation. This and other objects and advantages are achieved according to the invention, in which a second mirror, identical to the first in its characteristics, is placed in the path of the laser beam, with its angular position turned by 90° with respect to the spacial orientation of the first mirror. With this arrangement the radiation power measured in the reflected beam of the second mirror is independent of the polarization condition of the main beam of the laser:

The intensity I of the main beam of the laser is additively composed of two components P and S, the polarization directions of which are oriented to the first mirror in parallel (P) with or perpendicular (S) to the plane of incidence. For both components, the first mirror has different reflection capacities $R_{P1}$ and $R_{S1}$. The intensity $I_1$ of the first partial beam after the reflection on the first mirror will then amount to:

$$I_1 = P \cdot R_{P1} + S \cdot R_{S1}.$$

The components of the partial beam reflected on the second mirror are determined by the reflection coefficients $R_{P2}$ and $R_{S2}$. However, because of the 90° rotation of the second mirror, the original P-component becomes the S-component, and vice versa. The following therefore applies to the intensity of the second partial beam after the reflection on the second mirror:

$$I_2 = P \cdot R_{P1} \cdot R_{S2} + S \cdot R_{S1} \cdot R_{P2}$$

Since $R_{P1} = R_{P2}$ and $R_{S1} = R_{S2}$, the following applies to the total twice repeated reflection:

$$R_{P1} \cdot R_{S2} = R_{P2} \cdot R_{S1} = R_{total} = \text{const.}$$

$$I_2 = R_{total}(P+S).$$

The intensity $I_2$ is therefore proportional to the intensity I of the main beam of the laser, and specifically independent of the distribution of the components P and S within the sum (P+S). Thus, the proportionality factor $R_{total}$ is constant.

Since complete independence from the polarization condition of the incident light will be achieved only if the two partially transmitting mirrors, have identical reflection coefficients for the respective polarization planes of the impinging light, it is expedient for the two mirrors to be made of a uniformly coated splitter plate.

When using light guiding systems transmitting laser radiation, such as fiber optics, it is also expedient to arrange the first partially transmitting mirror between the output of the laser resonator and the input to the light guiding system.

Other objects, advantages and novel features of the present invention will become apparent from the following detailed description of the invention when considered in conjunction with the accompanying drawings.

DETAILED DESCRIPTION OF THE DRAWINGS

Figure 1:
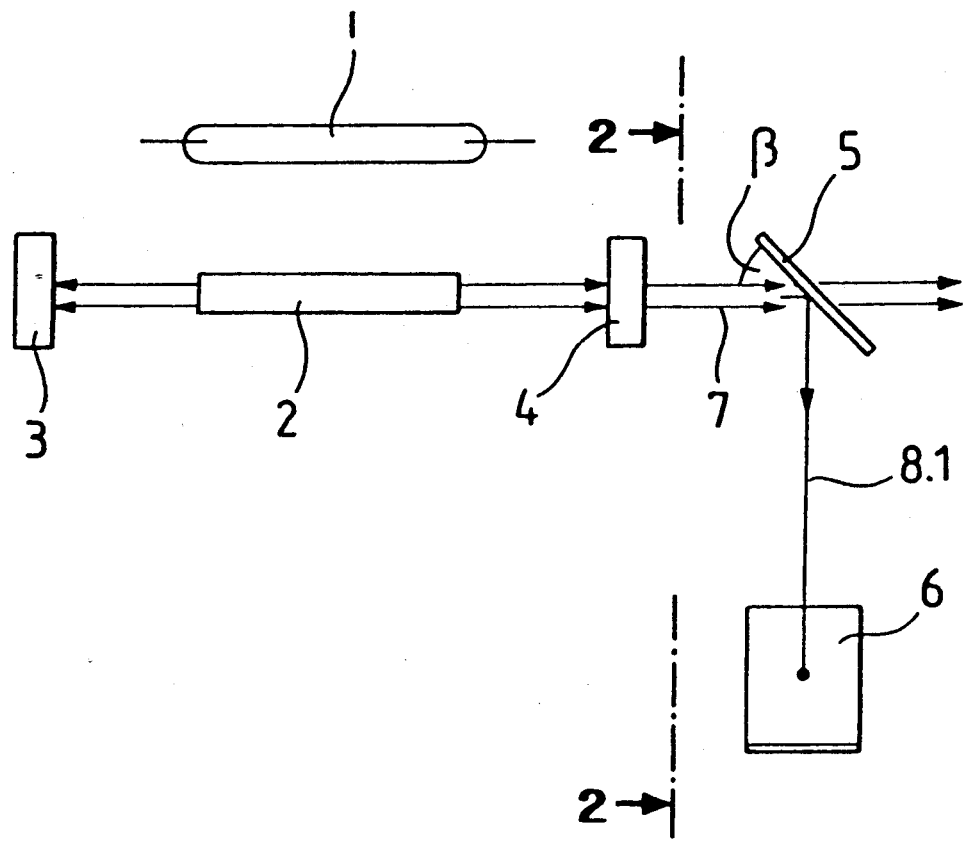
FIG. 1 is a partially schematic depiction of a device for measuring the radiation power of a laser according to the invention.
Figure 2:
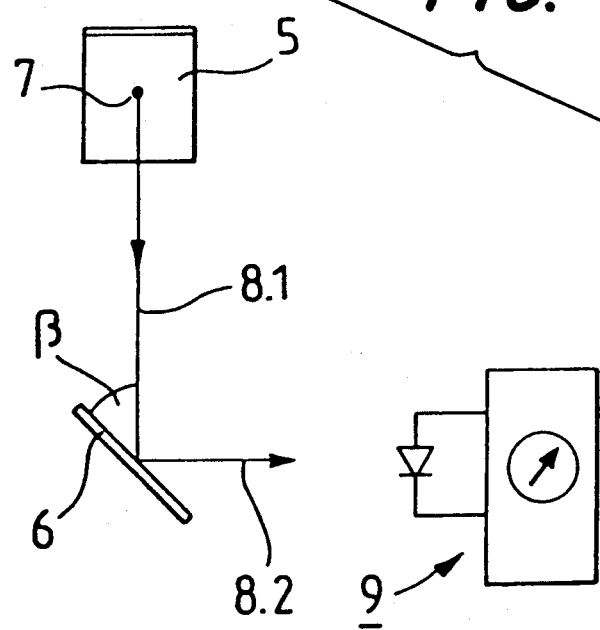
FIG. 2 is a sectional side view of the device shown in FIG. 1, broken away along line A—A, showing in addition a light detection apparatus.

Referring to FIGS. 1 and 2, a laser crystal 2, such as an Nd-YAG-crystal, is arranged between a high-reflecting mirror 3 with a reflection capacity of almost 100% as well as a couplingout mirror 4 with a reflection capacity of approximately 90%, this laser resonator being pumped by means of a pump lamp 1. The main laser radiation 7 emerging from the mirror 4 impinges on a partially transmitting mirror 5 which is arranged at an angle $\beta$ with respect to the beam direction, and by which 0.5% of the radiation 7 is coupled out of the main laser beam by reflection. This partial beam 8.1 impinges on a second partially transmitting mirror 6 which, as, shown in the sectional drawing A—A in FIG. 2, with respect to the partial beam 8.1, is arranged at the same angle as the first mirror 5 is arranged with respect to the main beam 7, but with respect to the first mirror 5 is rotated by 90° with respect to its spacial orientation so that the partial beam 8.1 experiences a deflection which (in FIG. 1) points vertically out of the plane of the drawing. It should be pointed out in this case that it is not absolutely necessary that the angle $\beta$ be 45°, as shown in the figures; however, the second mirror 6 must have a mirror surface which, with respect to an arbitrary polarization direction of the main laser radiation is rotated by 90° with respect to the first mirror 5.

The partial beam 8.2 reflected on the second mirror 6 will then be directed to an electro optic transducer 9 which includes a photodiode and a device measuring the current which passes through in a conventional manner.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An arrangement for measuring radiation power of a laser beam, having a first partially transmitting mirror arranged in a path of said laser beam, by which a portion of the radiation of said beam is coupled out to produce a first partial beam, and having an electro optic transducer adapted to measure intensity of said partial beam, wherein:
    a second partially transmitting mirror is arranged in a path of the first partial beam, by which a portion of said first partial beam is coupled out to produce a second partial beam;
    said second mirror is turned by 90° about a longitudinal axis of said first partial beam, relative to the spacial orientation of said first mirror;
    said first and second mirrors have the same reflecting properties with respect to the reflection of polarized light incident on a surface thereof, as a function of the polarization plane of said light; and
    the electro optic transducer is arranged in a path of said second laser beam.

2. An arrangement according to claim 1, wherein the first and the second partially transmitting mirrors are made of a splitter plate which is uniformly coated on its surface.

3. An arrangement according to claim 1, wherein the first partially transmitting mirror is arranged between a generator of said laser and a light guiding system.

4. An arrangement according to claim 2, wherein the first partially transmitting mirror is arranged between a generator of said laser and a light guiding system.

5. Method of measuring radiation power of a laser beam by means of first and second partially transmitting mirrors having substantially identical reflecting properties with respect to the reflection of polarized light incident on the surface thereof as a function of the orientation of a polarization plane of said polarized light, said method comprising the steps of:
    interposing said first partially transmitting mirror into said laser beam, said first partially transmitting mirror being oriented in a plane which is inclined at a predetermined angle with respect to a longitudinal axis of said laser beam, whereby a portion of said laser beam is reflected to form a first partial beam;
    interposing said second partially transmitting mirror into said first partial beam, said second partially transmitting mirror being oriented in a plane which is inclined at said predetermined angle relative to a longitudinal axis of said first partial beam and which is rotated by 90° about said longitudinal axis of said first partial beam relative to the orientation of the plane of said first partially transmitting mirror, whereby a portion of said first partial beam is reflected to form a second partial beam; and
    measuring intensity of said second partial beam.

* * * * *